(12) United States Patent
Basso et al.

(10) Patent No.: US 9,356,983 B2
(45) Date of Patent: May 31, 2016

(54) SYSTEM AND METHOD FOR ADAPTIVE CONTENT RENDITION

(71) Applicant: AT&T Intellectual Property I, L.P., Atlanta, GA (US)

(72) Inventors: Andrea Basso, Turin (IT); David C. Gibbon, Lincroft, NJ (US); Zhu Liu, Marlboro, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/330,692

(22) Filed: Jul. 14, 2014

(65) Prior Publication Data

US 2014/0325033 A1    Oct. 30, 2014

Related U.S. Application Data

(63) Continuation of application No. 12/869,006, filed on Aug. 26, 2010, now Pat. No. 8,779,266, which is a continuation of application No. 12/192,760, filed on Aug. 15, 2008, now Pat. No. 7,796,190.

(51) Int. Cl.

| | |
|---|---|
| *G10H 1/00* | (2006.01) |
| *H04L 29/06* | (2006.01) |
| *H04N 21/2389* | (2011.01) |
| *H04N 21/41* | (2011.01) |
| *H04N 21/4147* | (2011.01) |
| *H04N 21/4385* | (2011.01) |
| *H04N 21/4402* | (2011.01) |

(Continued)

(52) U.S. Cl.
CPC ............. *H04L 65/60* (2013.01); *H04N 21/2389* (2013.01); *H04N 21/4135* (2013.01); *H04N 21/4147* (2013.01); *H04N 21/4385* (2013.01); *H04N 21/4402* (2013.01); *H04N 21/4436* (2013.01); *H04N 21/44218* (2013.01)

(58) Field of Classification Search
CPC   G06Q 10/0833; G06Q 30/0256; H04W 4/02; H04W 64/00; H04W 4/027; H04W 4/025; H04W 88/02; H04W 8/20; H04W 8/22; H04W 36/32; H04W 8/24; H04W 48/04; H04W 8/08
See application file for complete search history.

(56) References Cited

U.S. PATENT DOCUMENTS

| | | | |
|---|---|---|---|
| 7,209,410 B2 * | 4/2007 | Yamanushi | ............ G11B 19/02 369/2 |
| 7,545,951 B2 | 6/2009 | Davis et al. | |
| 8,346,847 B2 | 1/2013 | Steakley | |

(Continued)

*Primary Examiner* — Marlon Fletcher

(57) ABSTRACT

Disclosed herein are systems, methods, and computer readable-media for adaptive content rendition, the method comprising receiving media content for playback to a user, adapting the media content for playback on a first device in the user's first location, receiving a notification when the user changes to a second location, adapting the media content for playback on a second device in the second location, and transitioning media content playback from the first device to second device. One aspect conserves energy by optionally turning off the first device after transitioning to the second device. Another aspect includes playback devices that are "dumb devices" which receive media content already prepared for playback, "smart devices" which receive media content in a less than ready form and prepare the media content for playback, or hybrid smart and dumb devices. A single device may be substituted by a plurality of devices. Adapting the media content for playback is based on a user profile storing user preferences and/or usage history in one aspect.

18 Claims, 4 Drawing Sheets

(51) Int. Cl.
*H04N 21/442* (2011.01)
*H04N 21/443* (2011.01)

(56) References Cited

U.S. PATENT DOCUMENTS

| | | | |
|---|---|---|---|
| 2003/0043073 A1* | 3/2003 | Gray | G01S 5/0215 342/465 |
| 2004/0117786 A1 | 6/2004 | Kellerman et al. | |
| 2004/0117818 A1 | 6/2004 | Karaoguz et al. | |
| 2004/0266529 A1* | 12/2004 | Chatani | A63F 13/12 463/40 |
| 2006/0092037 A1 | 5/2006 | Neogi et al. | |
| 2006/0209728 A1 | 9/2006 | Van Der Gaast | |
| 2006/0224517 A1* | 10/2006 | Shimpi | G06F 21/10 705/51 |
| 2006/0249576 A1* | 11/2006 | Nakada | H04L 67/306 235/382 |
| 2006/0265280 A1 | 11/2006 | Nakada et al. | |
| 2007/0091915 A1 | 4/2007 | Binder | |
| 2007/0106810 A1 | 5/2007 | Ryman | |
| 2007/0106811 A1 | 5/2007 | Ryman | |
| 2007/0112935 A1* | 5/2007 | Espelien | H04N 5/44582 709/217 |
| 2007/0153740 A1 | 7/2007 | Chang et al. | |
| 2007/0155307 A1* | 7/2007 | Ng | H04H 20/61 455/3.01 |
| 2007/0177558 A1* | 8/2007 | Ayachitula | H04W 28/18 370/338 |
| 2007/0198632 A1* | 8/2007 | Peart | H04L 12/2812 709/203 |
| 2007/0198682 A1 | 8/2007 | Pazhyannur et al. | |
| 2007/0213045 A1* | 9/2007 | Hermansson | G06F 1/1613 455/425 |
| 2007/0229350 A1* | 10/2007 | Scalisi | G06F 21/35 342/350 |
| 2007/0256115 A1 | 11/2007 | Lee | |
| 2007/0265971 A1 | 11/2007 | Smalley | |
| 2007/0276925 A1 | 11/2007 | LaJoie et al. | |
| 2007/0276926 A1 | 11/2007 | LaJoie et al. | |
| 2008/0064351 A1 | 3/2008 | Landschaft et al. | |
| 2008/0081558 A1 | 4/2008 | Dunko et al. | |
| 2008/0114836 A1 | 5/2008 | Zellner | |
| 2008/0125959 A1* | 5/2008 | Doherty | G06F 17/30241 701/532 |
| 2008/0126418 A1 | 5/2008 | Vignoli et al. | |
| 2008/0183645 A1 | 7/2008 | Burger et al. | |
| 2008/0189028 A1 | 8/2008 | Nair et al. | |
| 2008/0195664 A1* | 8/2008 | Maharajh | G06F 17/30035 |
| 2008/0209491 A1 | 8/2008 | Hasek | |
| 2008/0255870 A1 | 10/2008 | Butler | |
| 2008/0275974 A1 | 11/2008 | Rackiewicz | |
| 2008/0288578 A1 | 11/2008 | Silfvergerg | |
| 2009/0006336 A1 | 1/2009 | Forstall et al. | |
| 2009/0197617 A1* | 8/2009 | Jayanthi | G01C 21/3438 455/456.2 |
| 2009/0203388 A1 | 8/2009 | Karaoguz | |
| 2009/0228798 A1 | 9/2009 | Kephart et al. | |
| 2009/0232099 A1 | 9/2009 | Maenpaa | |
| 2009/0240864 A1 | 9/2009 | Kalayjian | |
| 2009/0276547 A1 | 11/2009 | Rosenblatt et al. | |
| 2009/0279681 A1 | 11/2009 | McKee et al. | |
| 2009/0282102 A1 | 11/2009 | Geurts et al. | |
| 2009/0299788 A1 | 12/2009 | Huber et al. | |
| 2009/0328087 A1 | 12/2009 | Higgins et al. | |
| 2009/0328124 A1 | 12/2009 | Khouzam et al. | |
| 2010/0027527 A1 | 2/2010 | Higgins et al. | |
| 2012/0156983 A1* | 6/2012 | Ortiz | H04N 7/17318 455/3.06 |
| 2013/0124619 A1 | 5/2013 | Steakley | |
| 2013/0245966 A1 | 9/2013 | Burroughs et al. | |
| 2014/0031120 A1* | 1/2014 | Mallinson | A63F 13/02 463/31 |
| 2015/0213401 A1* | 7/2015 | Gazdzinski | G06Q 10/08 705/332 |

\* cited by examiner

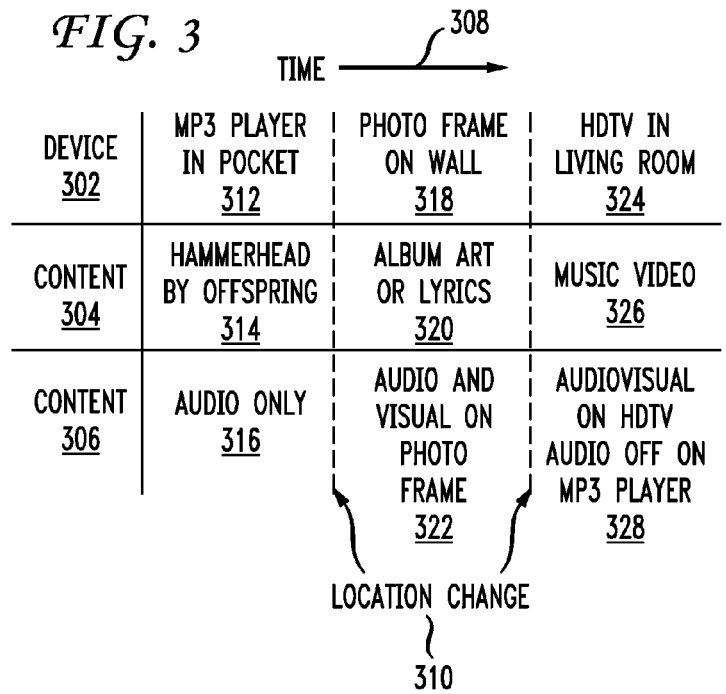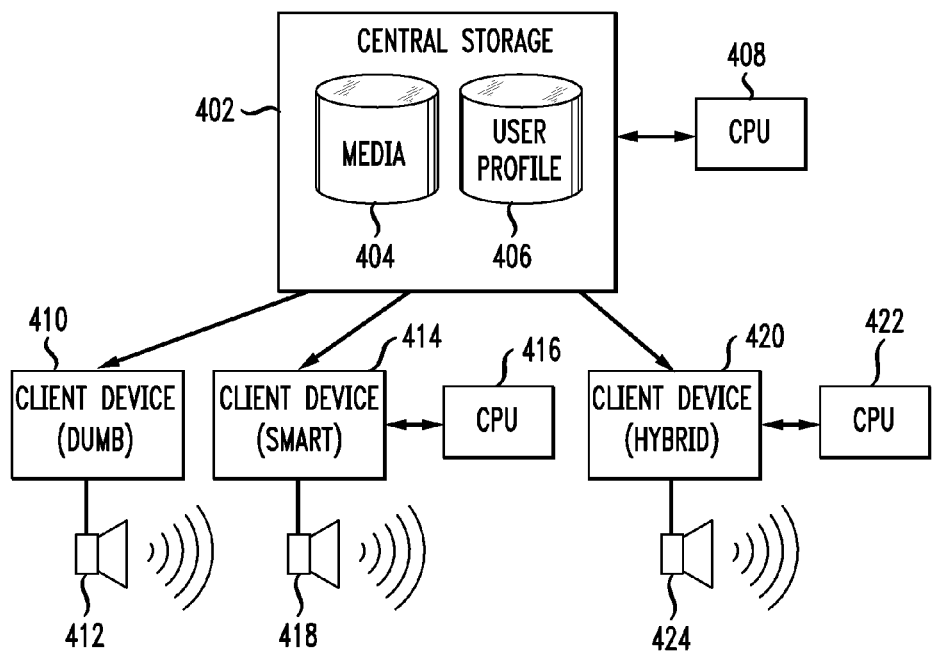

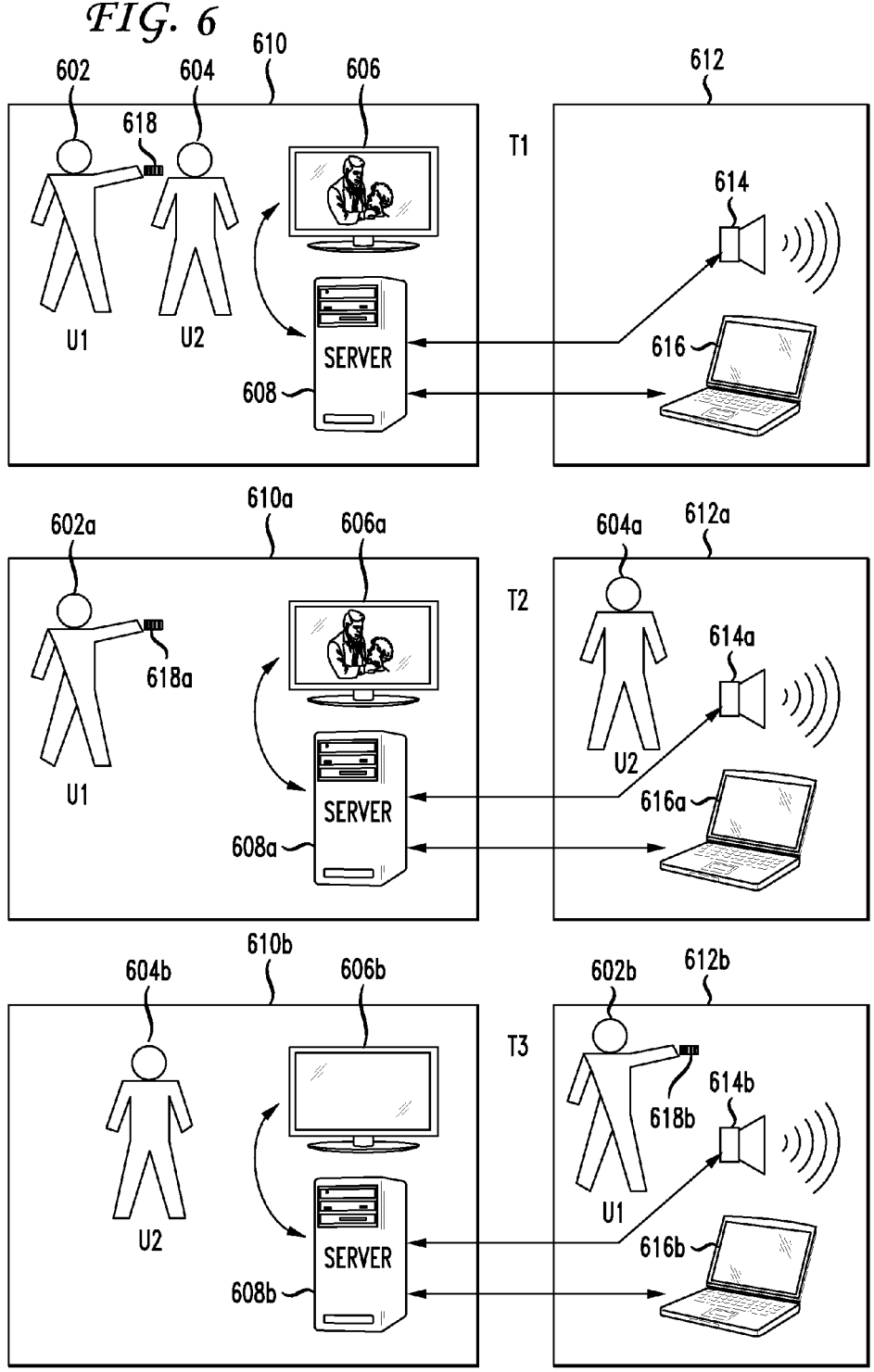

SYSTEM AND METHOD FOR ADAPTIVE CONTENT RENDITION

PRIORITY INFORMATION

The present application is a continuation of U.S. patent application Ser. No. 12/869,006, filed Aug. 26, 2010, which is a continuation of U.S. patent application Ser. No. 12/192,760, filed Aug. 15, 2008, now U.S. Pat. No. 7,796,190, issued Sep. 14, 2010, the content of which are included herewith in their entirety.

BACKGROUND OF THE INVENTION

1. Field of the Invention

The present invention relates to media playback and more specifically to adapting media playback to different devices as a user changes location.

2. Introduction

Media content has become accessible to many people in many places on many different devices. Mobile content consumption has become especially prevalent as mobile devices grow more powerful and capable of outputting not only songs and pictures, but movies and television shows. As users take these mobile devices through different environments such as different rooms in a house or an office, each environment has a potential plethora of devices capable of rendering media content but which are unused or are displaying competing media. Often these devices are already networked or capable of being networked with very little effort via DLNA, UPnP, or similar protocols. Such devices include televisions, amplifiers, media storage devices, digital photo frames, personal computers, speaker systems, cellular phones, appliances, etc. Any device capable of emitting sound or graphical output may be used to output media in some form or another.

The problem is that users change environments and change devices with no continuity between the media they are enjoying. A user is listening to a favorite song in the car from an iPod®, another not so favorite song on the garage radio as the user exits the car in the garage, sees a few moments of an unrelated television show in the front room as the user walks in the house, and sees a picture on the laptop screensaver in the bedroom. The cacophony of unsynchronized media devices is not unified and is often distracting.

Another problem is that users miss portions of a movie or other media presentation when they must temporarily leave in the middle. A typical movie is 90 to 120 minutes long, during which many people leave to purchase popcorn, go to the restroom, etc., and may miss out on a critical plot element or an exciting action scene. Epic movie collections such as Lord of the Rings or Star Wars are long enough by themselves, but are sometimes shown back to back making uninterrupted viewing even more difficult. Viewers sometimes have little control over when they must exit, so they cannot time their absence for a less important segment of the movie.

Accordingly, what is needed in the art is an approach to drive multiple devices in unison and give each device instructions on how to render a particular piece of media content a user is consuming to provide a complete experience that follows the user between environments and devices.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable-media for adaptive content rendition, the method comprising receiving media content for playback to a user, adapting the media content for playback on a first device in the user's first location, receiving a notification when the user changes to a second location, adapting the media content for playback on a second device in the second location, and transitioning media content playback from the first device to second device. One aspect conserves energy by optionally turning off the first device after transitioning to the second device. Another aspect includes playback devices that are "dumb devices" which receive media content already prepared for playback, "smart devices" which receive media content in a less than ready form and prepare the media content for playback, or hybrid smart and dumb devices. A single device may be substituted by a plurality of devices. Adapting the media content for playback is based on a user profile storing user preferences and/or usage history in one aspect.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 3 illustrates a timeline of transitions;
FIG. 4 illustrates different types of client devices;
FIG. 6 illustrates multiple users changing location.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
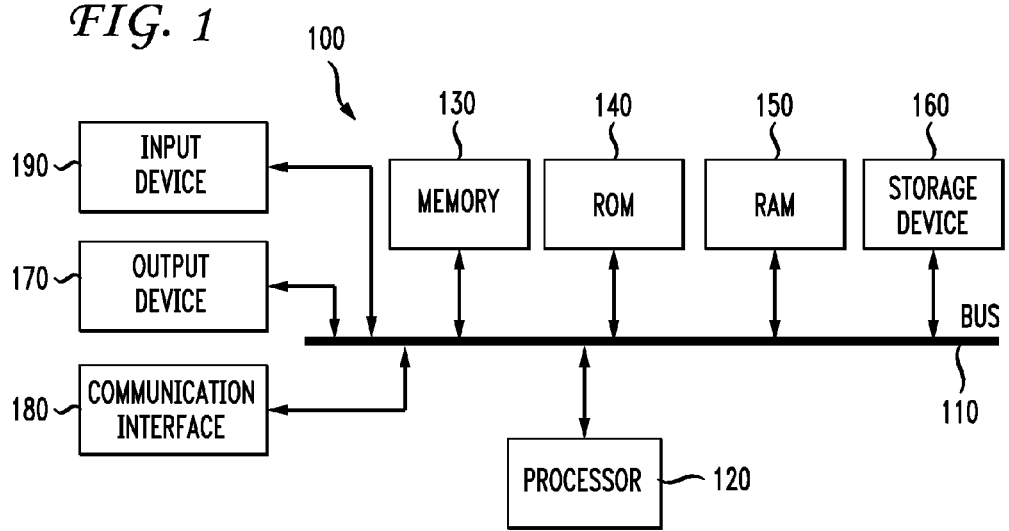
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
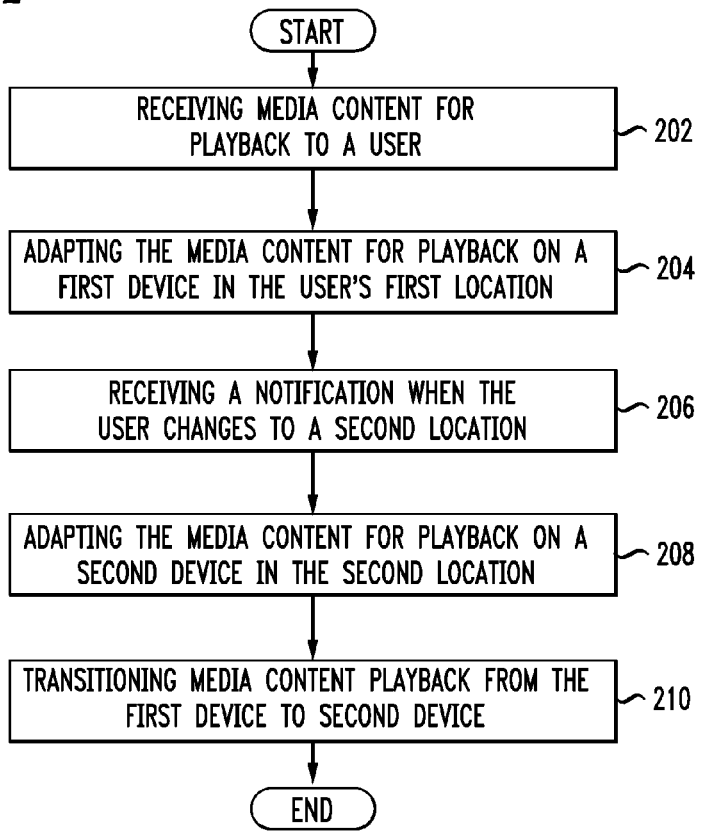
FIG. 2 illustrates an example method embodiment.

FIG. 2 illustrates an example method embodiment. The first step is receiving media content for playback to a user (202). A generic system for receiving media is a server that streams via the Internet or otherwise transmits media or portions of media to one or more client devices. In some cases, media is sent from a master server to an intermediate server, such as a home media server, before arriving at a client device. Media may be stored on the client device or streamed from one or more servers. The second step is adapting the media content for playback on a first device in the user's first location (204). In one example, a piece of media content is a motion picture including an audio track and a video track. If the first device only has capability to output audio, then the video track is ignored and only the audio track of the motion picture is played. One example server is a computer or collection of computers on the Internet that streams media to client devices around the world. Another example server is a home media server that orchestrates the media content delivery and streams the motion picture audio track to devices in and around a home. Smart client devices are capable of receiving unedited or unprepared media and preparing the media, while dumb client devices are only capable of playing what they receive without any preparation. Smart and dumb client devices are discussed below. Any device capable of media output (such as text, still images, full motion video, slide shows, audio, rumble or vibration, flashing lights, etc.) may be used with this method.

The third step is receiving a notification when the user changes to a second location (206). The first location and second locations may be rooms in a house, inside and/or outside a house, cubicles, vehicles, offices, elevators, etc. Even what would otherwise appear to be one room or location may be split into two or more locations for the purposes of these steps. For example, a long hallway with multiple digital photo frames or televisions hung along the walls may be split into multiple separate locations.

The distance between the first and second locations can be very small. For example, both locations can be within a single room or vehicle. In this way the system can appropriately handle scenarios in which the media content continuously follows the user. One specific example of this is a long hallway in a museum exhibit with a blend of different video and audio rendition devices. As the user passes through the long hallway, short movements between locations can signal a change to a second location. The minimum distance required to establish a change from a first location to a second location may be dynamic. The minimum distance can be a predefined threshold, such as 2 feet or 6 inches. The minimum distance can be determined in whole or in part by the placement, arrangement, and/or playback capabilities of the playback devices. Even the playback devices can be mobile as the user is mobile, which may impact the minimum distance between locations in real time.

In one aspect, sensing user movement is based on media content analysis and/or individual user analysis in order to transition on a user-specific basis. When multiple users are in the same location, tracking the user and analyzing his or her user profile may be performed in order to sense which user moves where. User profiles store information such as user preferences, usage logs, user account information, frequently consumed media, demographic information, digital rights management licenses, biometric identification, etc. A user may store preferences on a per-media basis, a per-location basis, or other scheme of rules. Further, the media content itself may contain clues or hints to sense which user is viewing or listening to media. For example, consider a wife reading in the living room and a husband watching ESPN® in the living room at the same time. When the wife leaves to go to the bedroom, the system analyzes her user profile and the content of the media (ESPN) to determine that she is not likely to be watching television, so the system does not adapt or transition media content to other devices in the bedroom. Assume again that the husband and wife are in the living room together. The husband leaves to go to the bathroom. The system analyzes his user profile and the content of the media (ESPN) determine that he is likely to be watching television. The system adapts and transitions ESPN to output devices in the hallway as he makes his way to the bathroom and in the bathroom as he arrives.

Sensors to determine when and where a user is changing location may not be universally available, may not be sufficiently sensitive, or may not be correct. In these and other situations, a user manually signals a change to a second location. The signal to a second location can be done with the press of a button, a gesture, a speech command, or any other input. One way this may be accomplished is with a switch, button, or other user interface installed next to light switches and connected or coupled to a server via a network or via the Internet. As a user enters a room, the user presses the button or flips the switch next to the light switch which signals to a home media server wirelessly or via a wired connection that the user desires the media to transition to devices in that room.

In one aspect, a third device assists in sensing when a desired specific user changes location. The third device may be an electronic token or other device that communicates wirelessly with location sensors distributed in multiple locations. The third device may be a network of weight sensors embedded in or under the flooring that tracks a user's movement throughout a building. The third device assists in sensing a user's change of location based on one or more of usage logs, physical proximity to the desired specific user, biometric identification, and/or other sensors for tracking an individual's movement currently known in the art or yet to be developed.

The fourth step is adapting the media content for playback on a second device in the second location (208). In one aspect, the media content is adapted by adding or removing elements of the media content based on the output capabilities of each device in the user's location. In a previous example, a piece of media content is a motion picture including an audio track and a video track. If the second device only has capability to output audio, then the video track is ignored and only the audio track of the motion picture is played by transmitting it to client devices for playback or signaling to client devices which audio track to retrieve from storage and where to start playback. On the reverse side, if the media content is a song (audio only) and the second device is a television, the media content is adapted for output through the television by playing the song and displaying associated content, such as video clips, still images, text, etc. If the second device is a personal computer, the media content is adapted for output by playing the song, displaying video content, and opening a webpage for the artist or artists. Advertisements may be incorporated into the output on the second device if the original media content does not include output matching the device capabilities. For example, an MP3 containing audio only which is output on a device having graphic capabilities allows for graphic advertisements like a link to purchase the remaining tracks in the album to be displayed.

Playback devices contain varying levels of sophistication. Some devices are classified as "dumb", some are classified as "smart", and some are hybrids of the two. Dumb devices simply receive media content already prepared for playback. A speaker and a simple photographic picture frame are examples of dumb devices. Smart devices receive media content in a less than ready form and prepare the media content for playback. Devices with processing units and/or network connections to request additional information from network resources generally qualify as smart devices. Hybrid devices lie somewhere in between. A hybrid smart device may be a smart device that is only used as a smart device when the preprocessing system or server is overloaded and cannot preprocess the media content in time. A hybrid smart device also includes devices which have inadequate processing power to prepare all types of media content on the fly. One example is a high definition television set which can process and prepare still photographs by itself, but cannot prepare a high definition video stream by itself. The collective resources of multiple interconnected smart devices may be pooled to provide greater ability.

The second device may be substituted by a plurality of devices. Where multiple devices are available in the second location, they play aspects or portions of the media content as they are able. In the example of a motion picture, a digital photo frame shows the visual portion of the media content while a home stereo system plays the audio portion. Multiple devices may share and/or coordinate playback of aspects or portions of the media content. For example, the user is viewing a movie on a television and moves to a room where displays are present and speakers are present but they are not integrated into a single device. The display and speaker share playback of their respective portions of the media. The display shows the video portion and the speaker plays the audio portion. Synchronized playback is generally preferred but not required. Overlapping audio playback from multiple devices with multiple speakers could be confusing or annoying if it is out of synch.

In another aspect, adapting media content for playback is based on a user profile storing user preferences and/or usage history. A user may have preferences on a per-media basis, a per-location basis, or other set of rules. For example, a user sets a preference that a specific movie is only output on large screens, or specifies no media playback of any kind in the bathroom, or sets a window of time between 2:00 pm and 4:00 pm when the children are asleep that no audio is played back.

One additional aspect includes the further steps of establishing and updating patterns of location changes based on usage history and current location data coming from a sensor network, anticipating when the user is likely to change to a second location, and adapting the media content for playback in advance of the user moving to the second location. Users who habitually follow the same daily routine are anticipated by this aspect. Consider the example of a user who gets home from work every day at 7:45 pm, turns on the 6:00 pm local news previously recorded by a digital video recorder, and goes to the kitchen to prepare dinner. The media content can be adapted in advance for devices in the kitchen. General or specific user preferences may also be deduced by tracking usage history. These deduced user preferences may be confirmed with the user or may be simply put in place where the user can correct or erase them. The user profile may be stored in a central location, on one or more of the playback devices, or both. User profiles may be synchronized between devices or synchronized with a central server after a certain number of changes, at a regular interval, or at the request of the user.

Of course, usage patterns are subject to change and may evolve over time. For example, a university student has a different schedule every semester and their routine changes based on that schedule. Usage history and current location data can be used to tweak patterns of usage to match and anticipate the user's current routine.

The fifth and final step is transitioning media content playback from the first device to second device (210). One way to transition a song is to gradually increase the volume of the second device while gradually decreasing the volume of the first device. Another way is to gradually increase the volume of the second device, leaving the first device unchanged. This allows for simultaneous playback on the first and second devices for a limited time. Simultaneous playback includes playback of one or more media elements on the first and second devices for a limited time. For example, a video clip is composed of video elements and audio elements. A documentary can be played on a television set, but as the user moves and the documentary is transitioned to a second device that has audio capabilities but not video, only the audio element is simultaneously played back.

The limited time may be set by a user, may be a pre-defined time, may be based on inactivity in the first location, etc. In one aspect, inactivity in the first location is indicated by motion or other sensors. In an energy conserving aspect, the first device is optionally turned off or switched to a lower power mode (such as standby or hibernation for a personal computer) after transitioning to the second device. For a video playback device, a lower power mode includes dimming the brightness.

FIG. 3 illustrates a timeline of two transitions. The rows represent the device 302, the content 304, and the context 306 as the media is played during the progression of time 308. The two vertical dashed lines represent when the user changes location. In the first position before any transition, the user is listening on an MP3 player in his pocket 312. The selected MP3 file is Hammerhead by The Offspring 314 and the context is audio only 316.

Moving to the right through the first location change 310 to a hallway, the MP3 player comes along with the user in his or her pocket, but a new device is a photo frame hanging on the wall 318. The photo frame has no audio output, but is capable of graphic display, so it displays the album art and/or lyrics 320 of the song. Depending whether the photo frame is a smart device or a dumb device, the album art and/or lyrics are prepared in advance by a server or by other devices or the photo frame can retrieve the album art and/or lyrics by itself. The context is the audio continuing to play in the MP3 player plus the visual display on the photo frame 322.

Moving to the right again through the second location change 310 to a living room, the photo frame is not in the new location, but the MP3 player is still in the user's pocket and a high definition television (HDTV) is in the living room 324. The HDTV is capable of full video output as well as high fidelity audio output, so the content displayed is the music video 326 of the Offspring song on the MP3 player. The HDTV is a smart device connected to the Internet or home server that automatically retrieves the music video and cues it to the appropriate spot to synchronize with the MP3 player. A central server may be used to accomplish the timing and synchronization or the individual devices may form a network to communicate with each other over a wired or wireless connection. The context of the media is the audiovisual display on the HDTV and the audio is turned off on the MP3 player 328 because the user set a preference to use the highest quality audio output, which is the HDTV in this case.

FIG. 4 illustrates different types of client devices and how they operate. A central storage 402 location contains a media database 404 and a user profile database 406. The central storage has a CPU 408. The CPU and the media and user profile databases may be wholly or partially integrated with the central storage or may be completely separate. In the case of a dumb client device 410, the central storage selects the media and uses its CPU to prepare and transmit it for output on the dumb client device. The dumb client device simply outputs 412 to a user what it receives from the central storage. A smart client device 414 has its own CPU 416. The central storage transmits raw media to the smart client device which prepares it for playback using its own CPU. Preparing it for playback can include transcoding, downloading additional content, separating out sub-components of the content, reducing the bitrate of the content, etc. The prepared media is output 418 to a user. A hybrid client device 420 has a similar structure to a smart client device in that it also has its own CPU 422. A hybrid client device may have a less powerful CPU, may lack an Internet connection, may house insufficient storage, or have some other shortcoming. Alternatively, the central storage's CPU may be more efficient in preparing media than the hybrid client's CPU. Hybrid client device CPUs may be used on-demand to take some of the load off the CPU of the central storage. The decision of how to utilize the CPU of a hybrid client device may be user configurable or may be dictated by the central storage. When the media content is prepared, the hybrid client device outputs 424 the media to a user. Multiple smart and/or hybrid client devices may be networked to combine their processing power as needed to prepare multiple pieces of media content or to assist in a processor-intensive operation.

Another aspect of hybrid devices is that not all of their features may be under internal control. For example, even a smart device may have no way of regulating volume other than an external knob that only a user can manipulate. In that case, a hybrid device is capable of doing everything itself except adjusting the volume.

Figure 5:
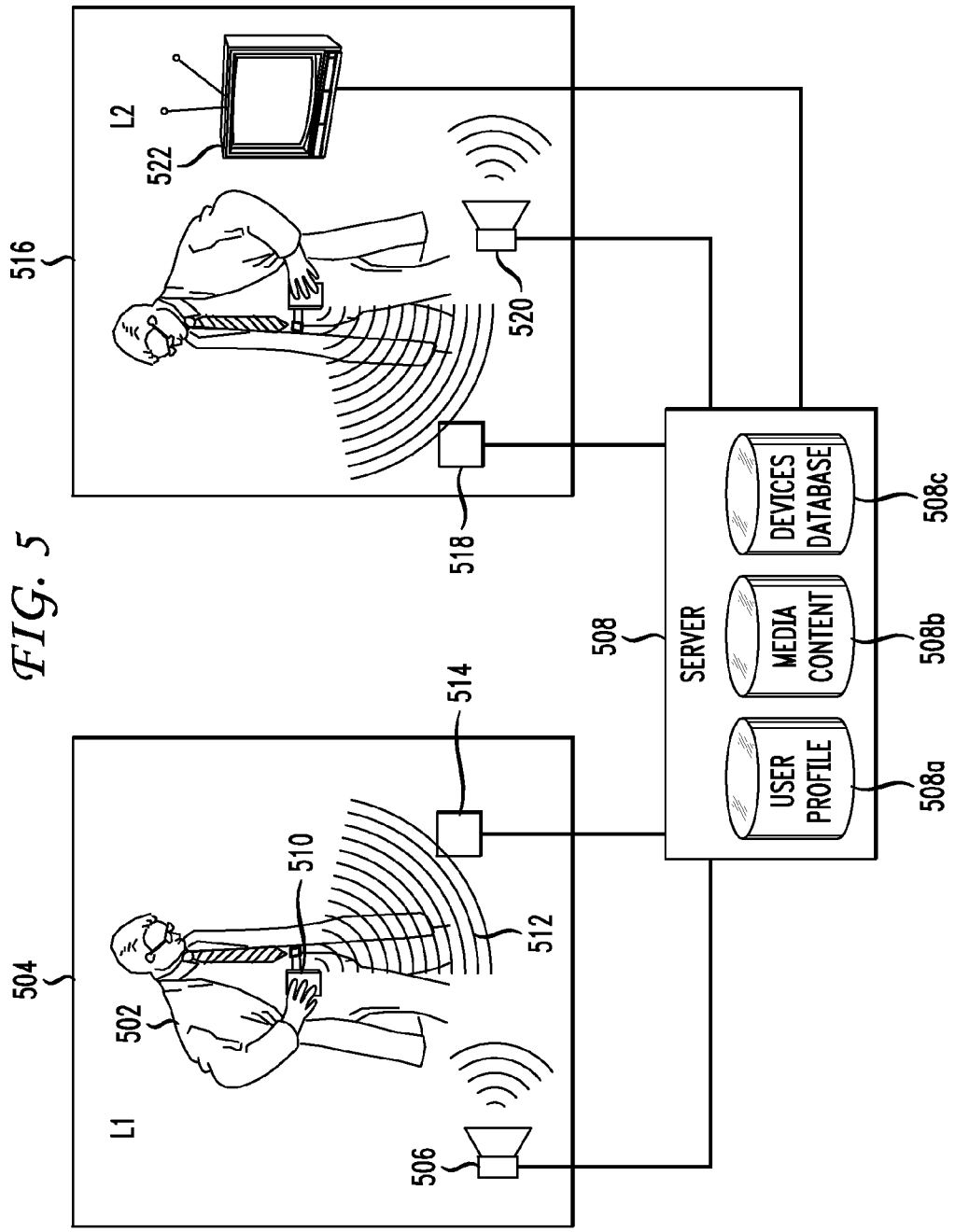
FIG. 5 illustrates a user changing location.

FIG. 5 illustrates a user changing location. A user 502 is first in location L1 504. The user is listening to a book on tape through a speaker 506 in L1. A server 508 is providing the book on tape. The server contains a user profile database 508a, a media content database 508b, and a device database 508c. The user profile database can store information such as user preferences, user personal information, usage history, DRM licenses or keys, playlists, subscription information, usernames and/or passwords to access premium content, etc. The media content database may include a library of media files or pointers to media files in other locations on a network. The device database stores the locations and capabilities of each playback device. For example, the device database is aware of the speaker 506 in L1 and knows that that speaker can only output audio. The server may periodically poll devices in the device database to ensure they still exist, are still connected, and still have all the known capabilities. As new playback devices are connected, they may advertise their presence to the server or the server may detect them.

The user 502 is carrying an electronic token 510 which communicates wirelessly 512 with a location sensor 514 in L1. The electronic token is a way to identify a particular user's location. Other devices or mechanisms may be substituted for the electronic token and location sensor, such as a biometric sensor or radio-frequency identification (RFID) tag integrated into a driver's license. The location sensor is connected to the server and relays the electronic token's (and the user's) location to the server. As the user moves to location L2 516, the electronic token communicates wirelessly with a location sensor 518 in L2 which informs the server that the user has changed location. The server responds by polling its device database 508c for available devices and their capabilities in L2 and discovers another speaker 520 and a television 522. The server further polls that user's profile in the user profile database and discovers that has set a preference prohibiting video display of any kind in L2. The server transitions the audio book playing at the speaker 506 in L1 to the speaker 520 in L2 and does nothing with the television 522 in accordance with the user's preferences. If the user had no preferences regarding showing video in L2, the server would have transmitted video to the television 522 as well as audio to the speaker 520. The server's connections and interactions with the location sensors and playback devices are illustrated in this example as direct wired connections but may also be implemented as wireless connections or across a network. Portions of the server may be integrated with the location sensors and distributed throughout multiple locations in a mesh network. Parts of the server such as user profiles may be duplicated and stored in multiple devices.

FIG. 6 illustrates multiple users changing location. At time T1, U1 602 and U2 604 are in the same location. U1 is watching a movie on the television 606. The movie is stored on and streamed to the television by a home media server 608. This is all in a first room 610. A second room 612 is nearby and contains a speaker system 614 and a laptop computer 616. Even though U2 is in the room with U1, U2 is not watching the movie on the television. U1 is holding the remote control 618 for the television, providing some indication that at least U1 is watching the movie.

At time T2, U2 604a moves to the second room 612a. Based on user profile or some other indication, the home media server 608a is aware that U2 was not actively viewing the movie. Therefore the home media server sends no signal to the speaker system 614a or the laptop computer 616a and continues to stream the movie to the television 606a so U1 602a can continue to view the movie in the first room 610a.

At time T3, U1 602b and U2 604b swap rooms so that U1 is in the second room 612b and U2 is in the first room 610b. The home media server 608b is aware that U1 was watching the movie based on user profile evaluation and based on the fact that U1 is holding the remote 618b. The server stops streaming the movie to the television 606b, and adapts the movie for output on the speaker 614b and laptop 616b in the second room where U1 is now located. As the movie is adapted for output, it is streamed to the speaker and laptop. Aspects of this invention may provide premium content to a user on a subscription basis. Control of transitioning from device to device and location to location can be centralized to one or more servers or it may be decentralized and distributed between the actual playback devices.

A practical application of the principles of this invention is the scenario where a family sits down to watch a movie together. The father starts a movie streaming from a home media server or other server to the television. Mid-movie, the sons needs to go to the kitchen to pop more popcorn. Instead of pausing the movie and forcing the rest of the family to wait while the son is absent, the son takes a portable media player along with him. The portable media player may be an iPod, PDA, Blackberry, an inexpensive device with a screen and speakers or headphones, etc. One way the portable media player can receive the media stream is via a mesh local area network distributed throughout the home. The portable media player allows the son to view a synchronized duplicate version of what is being shown on the television and receives essentially the same multimedia stream as the television. It might not be the exact same stream if the portable media player has different capabilities as the television. For example, the television may have 7.1 Surround Sound and a 16:9 widescreen aspect ratio while the portable media player only has a monaural speaker and a 4:3 full screen aspect ratio. While the multimedia stream is essentially the same, either the home media server or the portable media player adapts the movie for playback on the portable media player.

In one aspect, if the father fast forwards past a commercial in a television show recorded by a digital video recorder, the son's portable media player stays synchronized with what the rest of the family is viewing or it may continue normally independent of what the rest of the family is watching. The behavior of the portable media player may be based on user preferences or user input. At any point, the son has the option to disable the synchronization and view other portions of the movie or switch to an entirely different media. Assuming the son has not disabled synchronization, when the son returns from the bathroom and rejoins his family, the portable media player turns off and the son's view of the movie is uninterrupted.

One or more portable media devices may be designated as masters capable of controlling the playback of the group media presentation. For example, the father's remote control and the son's portable media player are designated as masters, so either can send control signals to the server to fast forward, pause, rewind, etc. Conversely, a device not designated as a master is a slave which may passively play media but does not allow for control of the media. A slave device may control the individual's media playback but does not have control over the media presentation of the group.

In an aspect relating to movie theaters, a theater provides a service for viewers allowing them to temporarily exit the theater where a movie is being shown without missing a portion of the movie. The theater selects one or more media streams for playback. Media streams are played on the main theater projector and a wireless broadcast within the confines of the theater. When multiple media streams are present, such as multiple movies broadcast simultaneously to correspond with multiple individual theaters in a cinema complex, each stream may be broadcast wirelessly on a different channel or using a different wireless technology. Multiple signals may be multiplexed in one, as is known in the art. Media streams can be broadcast using a mesh Bluetooth network, 802.11 network, or by a simple audiovisual broadcast. In addition to the main projection display of the movie, the theater provides portable devices capable of displaying the movie synchronized with the main display. Portable devices may be distributed to each moviegoer or may be located near an exit, hanging in a wall-mounted charging station for example. Digital projection theaters already have a digital stream which may be duplicated for broadcast to portable devices. As a user exits the theater, he or she takes one of the portable devices as he or she leaves and the portable device instantly starts synchronous playback of the movie. In the case of portable devices waiting in a charger, the device starts playback when it is removed from the charger. In the case of portable devices distributed to each moviegoer, playback on the portable device could be triggered by a button or a wireless signal when the user stands up or exits the room.

The portable device may store a copy of the movie internally and rely on a wired or wireless cue for where to start playback. As viewers need to leave to go to the restroom, to purchase concessions, or to attend to crying children, etc. viewers can still watch the movie on the portable device and not miss any of the plot or action. Unlike the example of a family watching a movie where the portable device may be a master and control playback, in a movie theater scenario, the portable devices are slaves only and have no control over the movie or how it is played back. They merely synchronously display the movie in a second location. As the viewer returns, the portable device is returned to the charging station and the portable device turns itself off or the viewer manually turns the device off.

If wireless signals are used, the signals may be encrypted to prevent outside parties from receiving the signal and viewing the movie for free. Portable devices may have an integrated remote homing feature to find the location of misplaced devices. Portable devices may include an alarm if taken from the building or may trigger an external alarm if taken beyond a certain threshold. Access to such portable devices may be on a subscription or pay-per-use basis. Alternatively, access to portable devices with small screens may be complimentary with the admission price, while larger screens and/or higher quality audio are provided for a fee. To prevent theft of such portable devices, access may be granted only after swiping a credit card or receiving some type of deposit. If the unit is not returned then the credit card is charged a penalty fee or the deposit is retained.

Because many moviegoers already have cellular phones or other devices capable of movie playback, a movie theater could provide a code, URL, or a phone number to call to provide the same service as described above, but streamed through the moviegoer's own device. The provided code, URL, or phone number may be valid for only the duration of the show. Alternatively, the code, URL, or phone number is good for only one use and allows the moviegoer to stream or download up to 5 minutes of the movie (or some other duration) before it is disabled.

In one aspect, a home media server stores media and streams it to client devices. In another aspect, the client devices contain their own storage and the home media server sends signals to the client devices indicating which media to play and where in the file to start playback. Beyond a home, a network server can be used in place of a home media server. A network server coordinates with and streams media as needed to devices in multiple locations to provide a seamless media playback experience. In addition to streaming, the network server prepares media for playback on dumb client devices. Other ways of media control are known in the art and may be applicable.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in home entertainment systems and comprehensive, immersive media systems bridging homes, vehicles, public places, offices, etc. Those skilled in the art will readily recognize various modifications and changes that may be made to the present invention without following the example embodiments and applications illustrated and described herein, and without departing from the true spirit and scope of the present invention.

We claim:

1. A method comprising:
    identifying, based on a mobile device, that a user consuming media content via a non-mobile device at a first location, has moved to a second location;
    determining, via a processor and according to an analysis of a user profile and the media content, a likelihood the user wants to continue consuming the media content at the second location; and
    when the likelihood is above a threshold:
        transferring the media content from the non-mobile device to the mobile device, wherein a format of the media content is adapted for playback on the mobile device according to display characteristics of the mobile device, to yield adapted media content, wherein the adapted media content is presented on the mobile device, wherein the media content is no longer presented on the non-mobile device, and wherein adaption of the format of the media content comprises one of adding and removing a media element of the media content according to the display characteristics of the mobile device.

2. The method of claim 1, wherein the mobile device is a smart device that receives media content in a less-than-ready form and prepares the media content for playback.

3. The method of claim 2, wherein the mobile device is a smart phone.

4. The method of claim 1, further comprising sensing user movement using a combination of media content analysis and individual user analysis.

5. The method of claim 1, further comprising:
    when the user approaches a second non-mobile device at a third location, transmitting an indication to the second non-mobile device instructing the second non-mobile device to begin presenting the media content.

6. The method of claim 1, wherein the non-mobile device turns off after transitioning to the mobile device.

7. The method of claim 1, wherein adapting the format of the media content is performed using the user profile, the user profile comprising one of user preferences, user demographic information, media keys, subscription information, credentials, and usage history.

8. The method of claim 7, wherein the user profile is stored separately from the non-mobile device and the mobile device.

9. A system comprising:
a processor; and
a computer-readable storage medium having instructions stored which, when executed by the processor, cause the processor to perform operations comprising:
identifying, based on a mobile device, that a user consuming media content via a non-mobile device at a first location, has moved to a second location;
determining, via a processor and via an analysis of a user profile and the media content, a likelihood the user wants to continue consuming the media content at the second location; and
when the likelihood is above a threshold:
transferring the media content from the non-mobile device to the mobile device, wherein a format of the media content is adapted for playback on the mobile device according to display characteristics of the mobile device, to yield adapted media content, wherein the adapted media content is presented on the mobile device, wherein the media content is no longer presented on the non-mobile device, and wherein adaption of the format of the media content comprises one of adding and removing a media element of the media content according to the display characteristics of the mobile device.

10. The system of claim 9, wherein the mobile device is a smart device that receives media content in a less-than-ready form and prepares the media content for playback.

11. The system of claim 10, wherein the mobile device is a smart phone.

12. The system of claim 9, the computer-readable storage medium having additional instructions stored which result in operations comprising sensing user movement using a combination of media content analysis and individual user analysis.

13. The system of claim 9, the computer-readable storage medium having additional instructions stored which result in operations comprising:
when the user approaches a second non-mobile device at a third location, transmitting an indication to the second non-mobile device instructing the second non-mobile device to begin presenting the media content.

14. The system of claim 9, wherein the non-mobile device turns off after transitioning to the mobile device.

15. The system of claim 9, wherein adapting the format of the media content is performed using the user profile, the user profile comprising one of user preferences, user demographic information, media keys, subscription information, credentials, and usage history.

16. The system of claim 15, wherein the user profile is stored separately from the non-mobile device and the mobile device.

17. A computer-readable storage device having instructions stored which, when executed by a computing device, cause the computing device to perform operations comprising:
identifying, based on a mobile device, that a user consuming media content via a non-mobile device at a first location, has moved to a second location;
determining, via a processor and according to an analysis of a user profile and the media content, a likelihood the user wants to continue consuming the media content at the second location; and
when the likelihood is above a threshold:
transferring the media content from the non-mobile device to the mobile device, wherein a format of the media content is adapted for playback on the mobile device according to display characteristics of the mobile device, to yield adapted media content, wherein the adapted media content is presented on the mobile device, wherein the media content is no longer presented on the non-mobile device, and wherein adaption of the format of the media content comprises one of adding and removing a media element of the media content according to the display characteristics of the mobile device.

18. The computer-readable storage device of claim 17, wherein the mobile device is a smart device that receives media content in a less-than-ready form and prepares the media content for playback.

* * * * *